United States Patent [19]

Laakmann

[11] 3,723,908
[45] Mar. 27, 1973

[54] PHASE STABILIZED AC POWER SUPPLY FOR REACTIVE LOADS

[75] Inventor: Peter Laakmann, Los Angeles, Calif.

[73] Assignee: Hugh Aircraft Company, Culver City, Calif.

[22] Filed: Sept. 2, 1971

[21] Appl. No.: 177,241

[52] U.S. Cl. .............. 331/177 R, 318/179, 323/22 T, 323/34, 331/113 R, 331/183
[51] Int. Cl. ............................ H03b 3/04, H03b 3/14
[58] Field of Search ..331/177 R, 177 V, 183, 113 A; 323/19, 22 T, 34–37; 318/171, 178, 179, 180

[56] References Cited

UNITED STATES PATENTS

| 3,590,361 | 6/1971 | Bishop et al. | 323/22 T X |
| 3,373,334 | 3/1968 | Geisz et al. | 323/22 T X |
| 3,593,078 | 7/1971 | Domshy et al. | 318/180 |

*Primary Examiner*—Roy Lake
*Assistant Examiner*—Siegfried H. Grimm
*Attorney*—W. H. MacAllister, Jr. et al.

[57] ABSTRACT

An AC power supply comprising a voltage controlled oscillator for synchronizing power switching sections which drive a load, such as a synchronous motor; a feedback circuit coupled between the load and the control input terminal of the voltage controlled oscillator adjusts the frequency thereof so as to cause a damping of oscillations caused by load variations.

11 Claims, 4 Drawing Figures

PHASE STABILIZED AC POWER SUPPLY FOR REACTIVE LOADS

BACKGROUND OF THE INVENTION

This invention relates to stabilized power supplies in general, and is especially applicable to high efficiency, AC power supplies.

In certain applications it is necessary to apply a large amount of sine wave power at a selected frequency to an electromechanical load, such as a motor, without allowing oscillatory variations in the power at the load. For example, in optical scanning systems, the mirror surfaced scanning wheel may be driven by a synchronous hysteresis motor and any modulation of the motor's speed adversely affects the clarity of the associated optical display. Heretofore the motor drive power in such applications has generally been developed by conventional Class B amplifiers which deliver constant voltage or current to the motor so as to produce constant torque. However, this type of power supply (Class B) generally suffers from low efficiency, 50 to 60 percent, for example; and such inefficiency is particularly undesirable in airborne applications. If it were attempted to develop the drive power at high efficiency such as from a switching type power supply followed by a low loss filter, the resulting configuration would tend to be oscillatory or insufficiently damped. The use of the just described high efficiency power supply to drive a synchronous motor would result in a constant average rotational rate, but a cyclic low frequency variation in speed would occur due to interaction of stored energy in the filters and rotating components. Such modulation of the motor's speed would be unacceptable in applications requiring a precise, constant rotational rate, such as optical scanning systems, and hence a high efficiency and stable power supply suitable for such applications would be a significant contribution to the art.

SUMMARY OF THE INVENTION

It is therefore a general object of the subject invention to provide a highly efficient and stable alternating power source.

A more specific object is to provide a reliable, efficient, lightweight power supply which is capable of driving a synchronous motor at a precisely constant speed.

Briefly, the subject invention includes a voltage controlled oscillator coupled to a power switching section for synchronism thereof. The output signal from the switching section is applied through a low-loss, low-pass filter to a reactance load, such as a synchronous motor. This highly efficient power conversion arrangement would normally tend to oscillate, but in accordance with the subject invention such oscillations are substantially reduced by a feedback circuit that provides damping by controlling the instantaneous frequency of the voltage controlled oscillator. In accordance with the disclosed embodiment, the feedback circuit is mechanized by means of an envelope detector and a passband filter coupled between the load and the control input terminal of the voltage controlled oscillator.

BRIEF DESCRIPTION OF THE DRAWINGS

The novel features of this invention as well as the invention itself will be better understood from the accompanying description taken in connection with the accompanying drawings, in which like reference characters refer to like parts and in which.

DESCRIPTION OF THE PREFERRED EMBODIMENT

Figure 1:
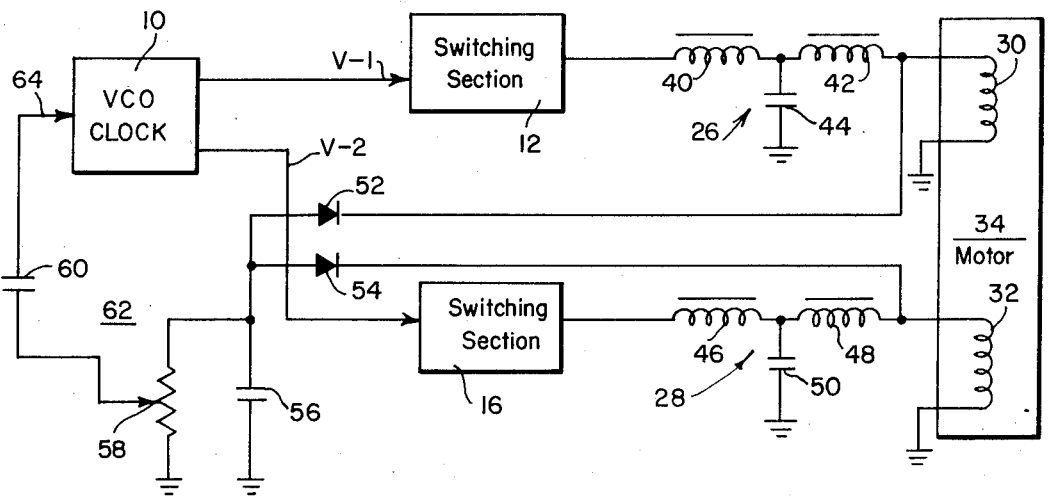
FIG. 1 is a schematic diagram of one preferred embodiment of a phase stabilized power supply in accordance with the subject invention.

Turning now to the drawings, a voltage controlled oscillator (VCO) clock circuit 10 provides output signals V-1 and V-2 of the same frequency, such as 500 hz, for example, but with a selected phase difference therebetween. Output signal V-1 is applied to a first switching section 12 for synchronism thereof; and output signal V-2 synchronizes a second switching section 16. The signal V-1 applied to switching section 12 is shown in a waveform 18 of FIG. 2; and the signal V-2 applied to switching section 16 is shown by a waveform 20.

Switching sections 12 and 16 may comprise one or more transistor power stages mechanized, for example, so that a source of DC power is applied to the output terminal of the switching section during one portion of each cycle of the input signal; and the DC source is disconnected from the output terminal during the remaining portion of each cycle of the input signal.

For certain applications such as driving synchronous motors, the output signals from the two switching sections should be approximately 90° out of phase, and in the embodiment of FIG. 1 this is implemented by voltage controlled oscillator clock circuit 10 which provides a 90° phase difference between synchronizing signals V-1 and V-2.

Figure 2:
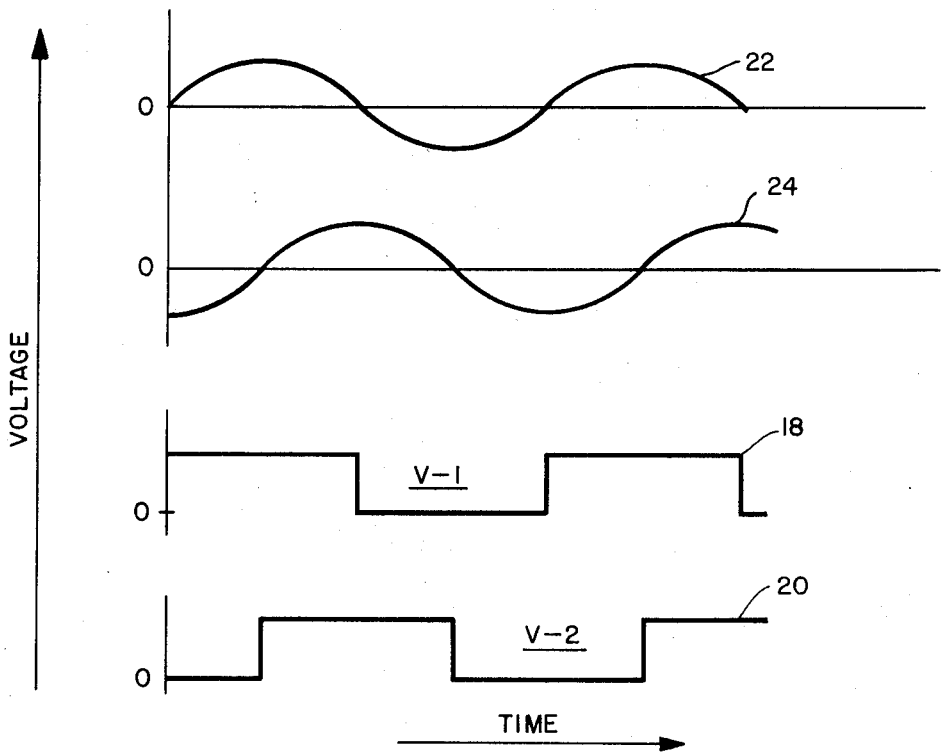
FIG. 2 shows voltage versus time waveforms useful for explaining the operation of the power supply circuit of FIG. 1.

The output signals from switching sections 12 and 16 are similar in shape to waveforms 18 and 20 of FIG. 2, and they are applied through low pass filters 26 and 28 to stator windings 30 and 32, respectively, of a synchronous motor (load) 34. Low pass filter 26 includes an input inductor 40; an output inductor 42; and a capacitor 44 coupled between the junction point of the inductors and a reference potential plane (ground). Low pass filter 28 includes an input inductor 46; an output inductor 48; and a capacitor 50 coupled between the junction point of the inductors and ground. The output voltages from low pass filters 26 and 28, which are applied to motor windings 30 and 32, are illustrated by waveforms 22 and 24, respectively, of FIG. 2.

The voltages across motor windings 30 and 32 are envelope detected by diodes 52 and 54 and applied to a low pass filter comprising a capacitor 56; and the output signal therefrom is applied by a gain control potentiometer 58 to a high pass filter comprising a capacitor 60. Low pass filter 56 and high pass filter 60 together form a bandpass filter generally designated by reference numeral 62. The bandpass of filter 62 is sufficient to encompass the natural frequencies of oscillation of the motor-power supply combination, for example, 1 – 20 hz. The output signal of pass band filter 62 is applied to a control voltage input terminal 64 of VCO 10.

Figure 3:
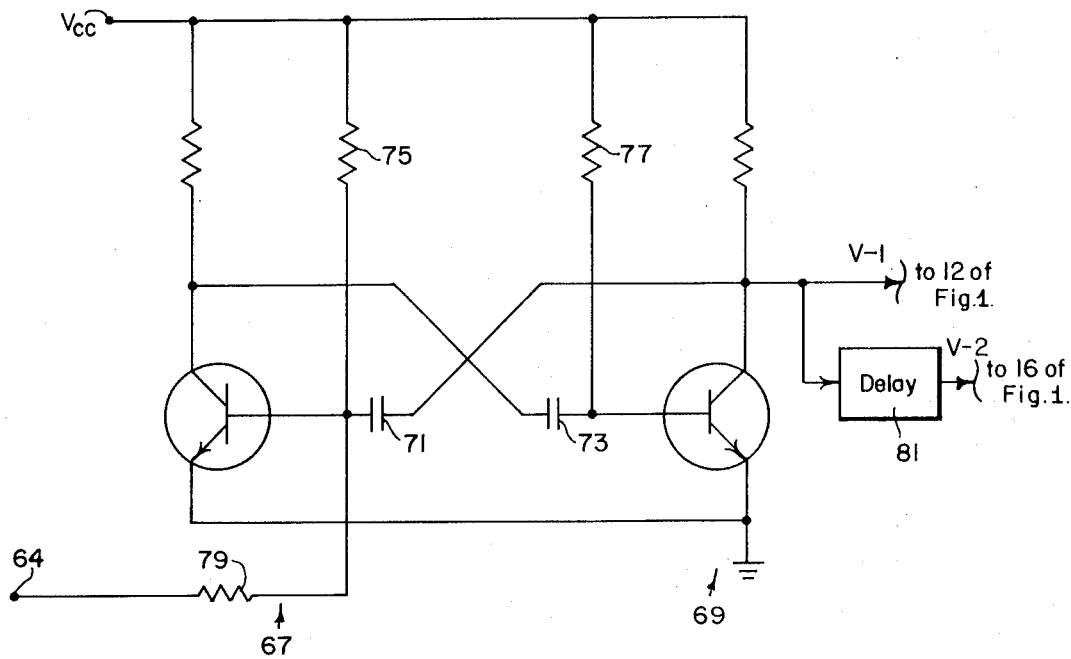
FIG. 3 is a schematic diagram of a voltage controlled oscillator clock circuit suitable for use in the power supply of FIG. 1.

Voltage controlled oscillator 10 may be any suitable conventional VCO circuit in which the frequency of its output signals varies as a function of the voltage applied to input terminal 64, and in which means are provided for producing a second output signal delay by 90° from a first output signal. One suitable mechanization for voltage controlled oscillator clock circuit 10 is shown conceptually in FIG. 3 as comprising a pair of transistor stages 67 and 69 crosscoupled by capacitors 71 and 73 to form a multivibrator configuration. The nominal value of the repetition frequency of output signal V-1 is determined primarily by the parameters of resistors 75 and 77 and capacitors 71 and 73. Variations in the frequency of the output signal about the nominal value are controlled by the current applied to capacitor 71 through resistor 79, from the input terminal 64. The output signal V-1 from the transistor stage 69 is delayed within a suitable delay unit 81 to produce the signal V-2. It is noted that the commanded variations in the repetition rate of the multivibrator of FIG. 3 about the nominal value are small, such as 20 hz variations about a nominal frequency of 500 hz; and hence the design of the delay circuit 81 is not complicated by having to provide a given phase delay over an extended frequency range.

Another mechanization of voltage controlled oscillator clock circuit 10 could include an oscillator circuit (not shown) in which one element of the frequency determining network is a voltage controlled capacitor (varactor). The nominal bias voltage applied to the varactor, in conjunction with the parameters of the other components of the frequency determining network, is selected such that the nominal frequency of the oscillator is a selected value, such as 500 hz, for example. The voltage applied to control input terminal 64 from passband filter 62 is superimposed upon (algebraically added to) the bias voltage across the varactor element so that the frequency of the output signal V-1 varies as a function of the voltage applied to terminal 64. The output section of this alternate configuration of VCO clock circuit 10 may include a high gain amplifier-limiter stage for each output signal (V-1 and V-2) for "squaring up" the applied sine wave signal — i.e. the positive portion of the sine wave is converted into a square wave of a first amplitude, and the negative portion of the sine wave into a square wave of a second level.

Diodes 52 and 54 are poled so that an increase in voltage at the motor windings (30 and 32 of FIG. 1) causes an increase in the instantaneous frequency of the signals V-1 and V-2.

Figure 4:
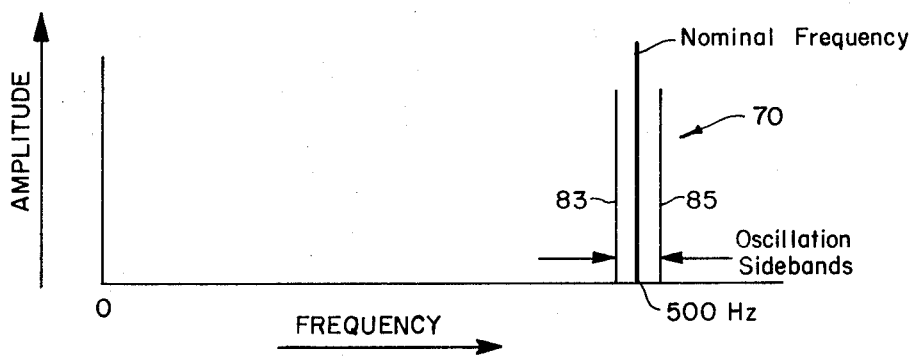
FIG. 4 depicts a waveform of power versus frequency useful for explaining the operation of the power supply circuit of FIG. 1.

For explaining the advantages of the invention a waveform 70 of FIG. 4 illustrates the spectrum of the signal which could be expected at the windings of load 34 if the feedback loop comprising the envelope detector (diodes 52 and 54) and passband filter 62, were disenabled. The amplitude and frequency of the oscillation sidebands, two of which are indicated by reference numerals 83 and 85, is a function of the energy storage capacity of the output circuits of the power supply and of the load — including the energy stored in the rotor (not shown) of motor 34. Waveform 70 illustrates for the case of no feedback, that the power to the load although primarily at the desired frequency of 500 hz, for example, also has significant content in sidebands around the nominal frequency.

Damping by means of frequency feedback can be explained in the following way. When motor 34 is in synchronism, the magnetic fields rotate at precisely the same rate as the hysteresis ring of the motor. If a disturbance should cause an infinitesimal decrease in speed of the hysteresis ring, energy is delivered from the motor to the supply. This causes a decrease in motor current or an increase in impedance, which in turn causes a reduction in torque and further slowdown. This process continues until the ring has been retarded in phase sufficiently to develop a high slip angle and all excess energy has been dissipated; and at this point the motor will again speed up. This process will then continue and produce sinusoidal speed variations. The motor may be considered as forming a spring mass system in rotary coordinates with the field being the spring and the inertia the mass.

In accordance with the invention, as the motor voltage increases with increased impedance and increased slip angle during the slow down phase the tendency to amplify the initial disturbance is damped by raising the instantaneous oscillation frequency of VCO 10 in response to an increase in motor voltage. Essentially this method stabilizes the instantaneous slip angle and counteracts any tendency for it to change. The increased frequency produces an instantaneous increase in torque and prevents slow down of the motor speed.

Although in the above described embodiment a two-channel device was selected for purposes of explanation, the invention is in no way limited to two channels. For example, a one-channel configuration could be readily mechanized by merely eliminating elements 16, 28, 54 and 81 of FIGS. 1, and 3; or more channels could be included by adding sets of the last mentioned group of elements. Also, it should be understood that although a very simple passband filter 62 was described herein as comprising shunt and series capacitor elements, that any type passband filter adapted for a particular application may be used within the concepts of the subject invention. For example, in some applications it may be desirable to use a multistage inductor-capacitor passband filter having "sharper" response characteristics.

In accordance with the invention power supplies having an efficiency of approximately 90 percent have been developed for providing 500 VA (Volts-Amps.) of power with low weight and cooling requirements. For example, one such unit weighing approximately 10 lbs. is capable of delivering 700 watts of power with only convection cooling.

Thus there has been described a novel power supply of improved efficiency and stability which has wide applicability, including, but not limited to, the accurate speed regulation of electrical motors.

I claim:

1. A device for applying alternating current power to a reactive load, said device comprising:
   a voltage controlled oscillator;
   a power switching stage synchronized by the output signal from said voltage controlled oscillator and having an output circuit adapted for being coupled to said load; and
   feedback means coupled between the load and the control input terminal of said voltage controlled oscillator for applying signals indicative of variations in the frequency of the power at the load, to the control input terminal of said voltage controlled oscillator so as to control the frequency of the output signals therefrom to effect a reduction in said variations in the frequency of the power at the load.

2. The combination of claim 1 wherein said feedback means includes means for adjusting the gain of the signals coupled therethrough.

3. The combination of claim 1 wherein said feedback means includes an envelope detector and a passband filter series coupled between said load and the control input terminal of said voltage control oscillator.

4. The combination of claim 3 wherein said envelope detector includes at least one diode poled to cause the instantaneous frequency of the output signal from said voltage controlled oscillator to increase in response to an increase in the voltage at the load.

5. The combination of claim 3 further comprising a low pass filter coupled between the output of said power switching stage and the load; with the load being coupled between the output of said low pass filter and a reference potential plane; and wherein said passband filter includes a first capacitance element coupled between said envelope detector and said reference potential plane, and a second capacitance element series coupled between said envelope detector and the control input terminal of said voltage controlled oscillator.

6. The combination of claim 5 wherein said feedback means includes a potentiometer coupled across said first capacitance element with an output terminal coupled to one terminal of said second capacitance element; and the other terminal of said second capacitance element being coupled to said control input terminal.

7. A device for supplying alternating current power to a reactive load, said device comprising: a voltage controlled oscillator for providing output signals whose instantaneous frequency vary as a function of a control voltage applied to a control input terminal thereof; a plurality of power switching stages; means for applying the output signals of said voltage controlled oscillator to synchronize said power switching stages so that there is a selected difference between the phase of the signal applied to each of said plurality of power switching stages; and means for coupling the output signals from said power switching stages to different sections of the load; wherein the improvement comprises feedback means coupled between said various sections of the load and the control input terminal of said voltage controlled oscillator for applying signals indicative of variations in the frequency of the power at the load, to the control input terminal of said voltage controlled oscillator so as to control the frequency of the output signals therefrom to effect a reduction in said variations in the frequency of the power at the load.

8. The combination of claim 7 wherein said feedback means includes an envelope detector having its input coupled to each of the load sections, and passband filter means series coupled between the output of said envelope detector and the control input terminal of said voltage controlled oscillator.

9. The combination of claim 7 wherein said feedback means includes means for adjusting the gain of the signals coupled from the load sections to said control input terminal.

10. The combination of claim 8 wherein said envelope detector includes a plurality of diodes poled so as to cause the instantaneous frequency of the output signal from said voltage controlled oscillator to increase in response to an increase in the voltage at the load.

11. The combination of claim 8 further comprising a different low pass filter coupled between the output of each power switching stage and the associated load section, with each load section being coupled between the output of the associated low pass filter and a reference potential plane; and wherein said passband filter includes a first capacitance element coupled between said envelope detector and said reference potential plane, and a second capacitance element series coupled between said envelope detector and the control input terminal of said voltage controlled oscillator.

* * * * *